United States Patent [19]
Morita et al.

[11] Patent Number: 5,567,058
[45] Date of Patent: Oct. 22, 1996

[54] ROLLING BEARING UNIT WITH ROTATING SPEED SENSOR

[75] Inventors: Kouichi Morita; Junshi Sakamoto, both of Fujisawa; Takamichi Okada, Hannou, all of Japan

[73] Assignees: NSK Ltd., Tokyo; Shindengen Electric Manufacturing Co., Ltd., Saitama-Ken, both of Japan

[21] Appl. No.: 502,801

[22] Filed: Jul. 14, 1995

[30] Foreign Application Priority Data

Jul. 15, 1994 [JP] Japan .................................. 6-164264

[51] Int. Cl.$^6$ .................................................. F16C 19/08
[52] U.S. Cl. ........................... 384/448; 384/446; 324/174
[58] Field of Search ...................... 384/448, 446, 384/544, 537; 324/174

[56] References Cited

U.S. PATENT DOCUMENTS

| | | | |
|---|---|---|---|
| 5,264,790 | 11/1993 | Moretti et al. | 384/448 |
| 5,293,124 | 3/1994 | Caillaut et al. | |
| 5,385,411 | 1/1995 | Shirai et al. | 384/448 |
| 5,441,335 | 5/1995 | Driver | 384/448 |
| 5,509,310 | 4/1996 | El-Ibiary | 384/448 |

FOREIGN PATENT DOCUMENTS 0495323   7/1992   European Pat. Off. .

*Primary Examiner*—Lenard A. Footland
*Attorney, Agent, or Firm*—Helfgott & Karas, P.C.

[57] ABSTRACT

A rolling bearing unit with a rotating speed sensor comprising a hub having a flange for mounting a vehicle wheel and an inner ring raceway, an outer ring having a mount portion for supporting a suspension apparatus and an outer ring raceway, a plurality of rolling members between the inner ring raceway and the outer ring raceway, a sensor supported by the outer ring, a tone wheel mounted to the hub so as to be faced to the sensor, an annular support frame having a cylindrical mount portion, a flanged portion and a support portion, the cylindrical mount portion fitted onto the outer ring, the flanged portion bent inwards at right angles at an edge of the mount portion and having a side face, the support portion having a circumferential end face and projected from the side face of the flanged portion, and a conductive member projected from the circumferential end face of the support portion to output signals from the sensor, the circumferential end face of the support portion and part of the flanged portion conjointly defining a through-hole, so that the conductive material is extended through the through-hole and projected from the circumferential end face of the support portion, and the support portion being filled with a non-magnetic insulating material, so that the sensor is embedded in the non-magnetic insulating material.

2 Claims, 7 Drawing Sheets

ROLLING BEARING UNIT WITH ROTATING SPEED SENSOR

BACKGROUND OF THE INVENTION

1. Field of the Invention

The present invention is related to a rolling bearing unit with a rotating speed sensor, for example, in order to rotatably support a vehicle wheel to a suspension apparatus while being capable of detecting the rotating speed of the vehicle wheel.

2. Description of the Related Art

In order to rotatably support a vehicle wheel with reference to a suspension apparatus while being capable of detecting the rotating speed of the vehicle wheel thereby controlling the anti-lock brake system (ABS), or the traction control system (TCS), rotating bearing units with a rotating speed sensor are disclosed e.g. in Japanese Patent First Publications KOKAI No. 3-39161 and No. 3-48768.

The rolling bearing unit with the rotating speed sensor as disclosed in the publications mentioned above is constructed as shown in FIG. 1, and has a hub 1 the axially outer end portion (left end portion in FIG. 1) of which is formed with a flange 2 for supporting a vehicle wheel (not shown). What is meant by the axially outer end portion is the end portion which is located on the outer end side in the width direction when mounted to the vehicle.

The hub 1 has an axially intermediate portion with the outer peripheral surface of which is formed with an inner ring raceway 3a. In addition, an inner ring 4 is fitted onto the outer peripheral surface of the axially intermediate portion of the hub 1 and has an inner ring raceway 3b on its outer peripheral surface.

On the axially inner end portion (right end portion in FIG. 1) of the hub 1, a male threaded portion 5 is formed on its outer peripheral surface and screwed into a nut 6.

What is meant by the axially inner end portion is the end portion which is located on the central side in the width direction when mounted to the vehicle.

The nut 6 screwed onto the male thread portion 5 for clamping presses the axially inner end face of the inner ring 4 to fix the inner ring 4 at a predetermined location on the outer peripheral surface of the hub 1.

The outer ring 7 has a mount portion 9 on its outer peripheral surface for supporting a knuckle (not shown) of the suspension apparatus, and a pair of outer ring raceways 10a, 10b on its inner peripheral surface.

A plurality of rolling members 11 are provided between the outer ring raceway 10a and the inner ring raceway 3a, and between the outer ring raceway 10b and the inner ring raceway 3b, so that the hub 1 is rotatably supported in the interior of the outer ring 7 which is supported by the suspension apparatus through the mount portion 9.

The hub 1 has an axially inner end portion which is protected from the nut 6 so as to be fitted into an annular tone wheel or pulser ring 12.

Fittingly fixed onto the opening portion of the outer ring 7 at its axially inner end is a cover 13 by which a sensor 14 is supported. The tone wheel or pulser ring 12 is faced to the axially outer end face of the sensor 14. Seal members 8 are mounted between the outer peripheral surface of the hub 1 and the inner peripheral surface of the outer ring 7 at its axially outer end and between the outer peripheral surface of the hub 1 and the inner peripheral edge of the cover 13 at its axially inner end, so as to close the openings at the both ends of the space between the inner peripheral surface of the outer ring 7 and the outer peripheral surfaces of the hub 1 and inner ring 4 where the rolling members 11 and the tone wheel 12 are provided.

With the rolling bearing unit with the rotating speed sensor as mentioned above, the vehicle wheel fixed to the flange 2 at the axially outer end portion of the hub 1 is rotatably supported with reference to the suspension apparatus which supports the outer ring 7.

As the tone wheel 12 fittingly fixed onto the axially inner end portion of the hub 1 is rotated with the rotation of the vehicle wheel, the output of the sensor 14 faced to the tone wheel 12 is changed. The frequency of the output change of the sensor 14 is proportional to the rotating speed of the vehicle wheel. Accordingly, the output signal of the sensor 14 is transmitted through the conductive member or lead 15 to a control device (not shown), so that the rotating speed of the vehicle wheel is obtained so as to properly control the ABS and TCS.

It will be noted that the lead 15 to output signals from the sensor 14 is extended axially inward (right in FIG. 1) in the conventional rolling bearing unit with the rotating speed sensor as mentioned above. In this construction, any interference is inclined to be made between the lead 15 and the constant velocity joint 16 to rotate the hub 1 (see FIG. 5 and FIG. 2).

Specifically, provided that the lead 15 is made longer and provided with an electric plug at its end, while a connector provided to the sensor 14 is connected with the electric plug after the rolling bearing unit is mounted to the suspension apparatus, the rolling bearing unit is easily mounted to the suspension apparatus and the convenience upon mounting the rolling bearing unit to the vehicle body is improved. In such a case, however, the electric plug is often prevented from being inserted into the connecter due to the interference with the constant velocity joint 16.

In order to avoid such inconvenience, the rolling bearing unit with the rotating speed sensor as shown in FIG. 2 through FIG. 4 is disclosed in Japanese Utility Model First Publication KOKAI No. 5-43074.

In this second conventional structure, the inner ring 4 has an axially inner end portion which is slightly projected from the axially inner end face of the hub 1 so as to be abutted to the axially outer end face of the constant velocity joint 16 for rotating the hub 1.

In addition, the tone wheel 17 is of a cylindrical shape and has an axially outer half portion which is fittingly fixed onto the outer peripheral surface of the inner ring 4 at its axially inner end portion. In addition, the tone wheel 17 has an axially inner half portion part of which is axially projected from the axially inner end face of the inner ring 4 and formed with a plurality of through holes 24 with a uniform size evenly spaced apart from each other in the circumferential direction.

In addition, seal members 8 are mounted between the inner peripheral surfaces of the outer ring 7 at its axially inner and outer end portions and the outer peripheral surfaces of the hub 1 and the inner ring 4, respectively, so as to close the open end portions of the space provided between the inner peripheral surface of the outer ring 7 and the outer peripheral surfaces of the hub 1 and the inner ring 4 to accommodate the rolling members 11.

A support frame member 18 as shown in FIG. 3 is fitted onto and fixed to the axially inner end of the outer ring 7. The support frame member 18 is of a generally annular shape and made by press-forming a metal plate such as stainless steel, and comprised of a cylindrical mount portion 19 which is adapted to be fitted onto the axially inner end of the outer ring 7, an inwardly flanged portion 20 which is radially inwards bent at right angles at the axially inner edge of the mount portion 19, and a support portion 21 which is axially protected from the axially inner side face (right side face in FIGS. 2 and 3) of the flanged portion 20 at a circumferential location. The support portion 21 has a radially inward opening. A sensor 22 is supported by the support portion 21 and has a detecting portion 23 faced to the axially inner half portion of the tone wheel 17 where the through-holes 24 are formed.

The support portion 21 is provided with a connector 25 on one of the circumferential end walls 26. It will be noted in FIG. 3 that the connecter 25 is protected from that end wall 26, and adapted to receive the electric plug fixed to the end of the lead (not shown in FIG. 3) so as to output the signals detected by the sensor 22. The connector 25 is positioned as in FIG. 4 between the inner and outer peripheral edges 18a, 18b of the support frame 18 and directed in the circumferential direction with reference to the support frame 18.

In the case of this second example in the conventional rolling bearing unit with the rotating speed sensor as mentioned above, the electric plug (not shown in FIG. 4) which is fixed to the end of the lead to take out the signals from the sensor 22 is moved in a circumferential direction of the support frame 18 toward the connecter 25 as shown by the arrow G in FIG. 4 and inserted into the connector 25 for connection between the lead and the sensor 22. It will be noted in this structure that the connection between the electric plug of the lead and the connector 25 is accomplished without interference by the constant velocity joint 16 (FIG. 2).

However, in the case of the second example in the conventional bearing unit, there are still the following problems to be solved.

In order that the sensor 22 is supported by the support portion 21 formed in the support frame 18, generally a thermoplastic synthetic resin is filled in the support portion 21 with the parts of the sensor 22 provided in the support portion 21. The thermoplastic synthetic resin filled in the support portion 21 is solidified encapsulating the parts of the sensor 22.

The connector 25 must be projected from the end wall 26 of the support portion 21 in order to take out the signals from the sensor 22. However, in the case of the conventional structures as mentioned above, no attention is paid to the easy operation for projecting the connector 25 from the end wall 26 of the support portion 21.

In the case of the end wall 26 simply having a through-hole formed for the connector 25, the operation for setting the sensor 22 in the support portion 21 and inserting the connector 25 into the through-hole is inconvenient. Consequently, this may be an obstacle in producing efficiently the rolling bearing units with the rotating speed sensor.

The end wall 26 may be provided with a slot which is opened in the radially inward end edge of the support frame 18, so that the connector 25 can be inserted through the opening of the end edge into the slot. With this construction, however, the support rigidity for the sensor 22 may be insufficient even in the state where the sensor 22 is installed in the support portion 21 and embedded with the synthetic resin filled in the support portion 21.

Specifically, the support portion 21 as illustrated in FIG. 4 is of a sector shape with the larger width on the radially outer side and with the smaller width on the radially, and its support rigidity depends on the end walls 26. Therefore, if the end wall defining the support portion 21 has enough rigidity, the mass of synthetic resin fitted and solidified in the support portion 21 is not displaced in both of the radially inward and outward directions. However, where the slot as mentioned above is formed in the end wall 26 of the support portion 21, the rigidity of the end wall 26 is lowered, and the connector 25 can be displaced radially inward through the slot opening, resulting in that the mass of synthetic resin can be easily displaced radially inward. Consequently, the support rigidity for the sensor 22 may be insufficient resulting in that the rotating speed sensor having such a construction is insufficient in endurance and dependability.

SUMMARY OF THE INVENTION

One object of the present invention is to provide a rolling bearing unit with the rotating speed sensor overcoming the problems as mentioned above.

A rolling bearing unit with a rotating speed sensor in the present invention comprising a hub having an axially inner end portion and an axially outer end portion to which a flange is provided for mounting a vehicle wheel and an outer peripheral surface on which an inner ring raceway is provided, an outer ring having an axially inner end portion, an outer peripheral surface to which a mount portion is provided for supporting a suspension apparatus and an inner peripheral surface on which an outer ring raceway is formed, a plurality of rolling members provided between the inner ring raceway and the outer ring raceway, a sensor supported by the outer ring and having a detecting portion, a tone wheel mounted to the axially inner end portion of the hub so as to be faced to the detecting portion of the sensor, a support frame made of a metal plate in a generally annular shape, and having a cylindrical mount portion having an inner end edge and fitted onto the axially inner end portion of the outer ring, the support frame having a flanged portion bent inwards at right angles at the inner end edge of the mount portion and having an inner side face, the support frame having a support portion having an end wall to define a circumferential end face and projected from the inner side face of the flanged portion, so that the sensor is supported within the support portion, and a conductive member projected from the end wall of the support portion to output signals from the sensor, the circumferential end face of the support portion and part of the flanged portion conjointly defining a through-hole, so that the conductive material is extended through the through-hole and projected from the end wall of the support portion, and the support portion being filled with a non-magnetic insulating material, so that the sensor is embedded in the non-magnetic insulating material.

DESCRIPTION OF THE PREFERRED EMBODIMENTS

Figure 1:
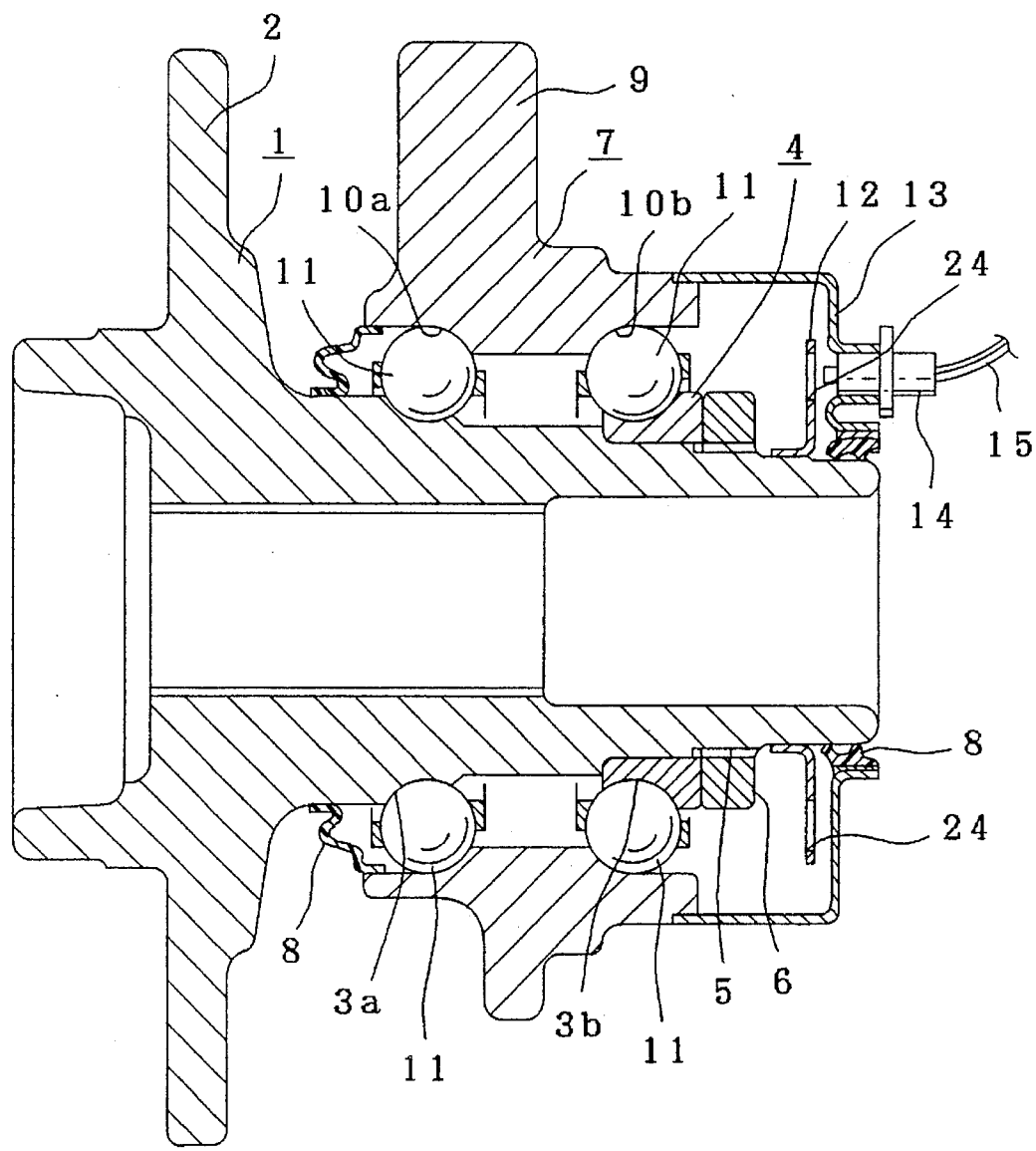
FIG. 1 is a cross sectional view of one example of the conventional rolling bearing units with the rotating speed sensor.
Figure 2:
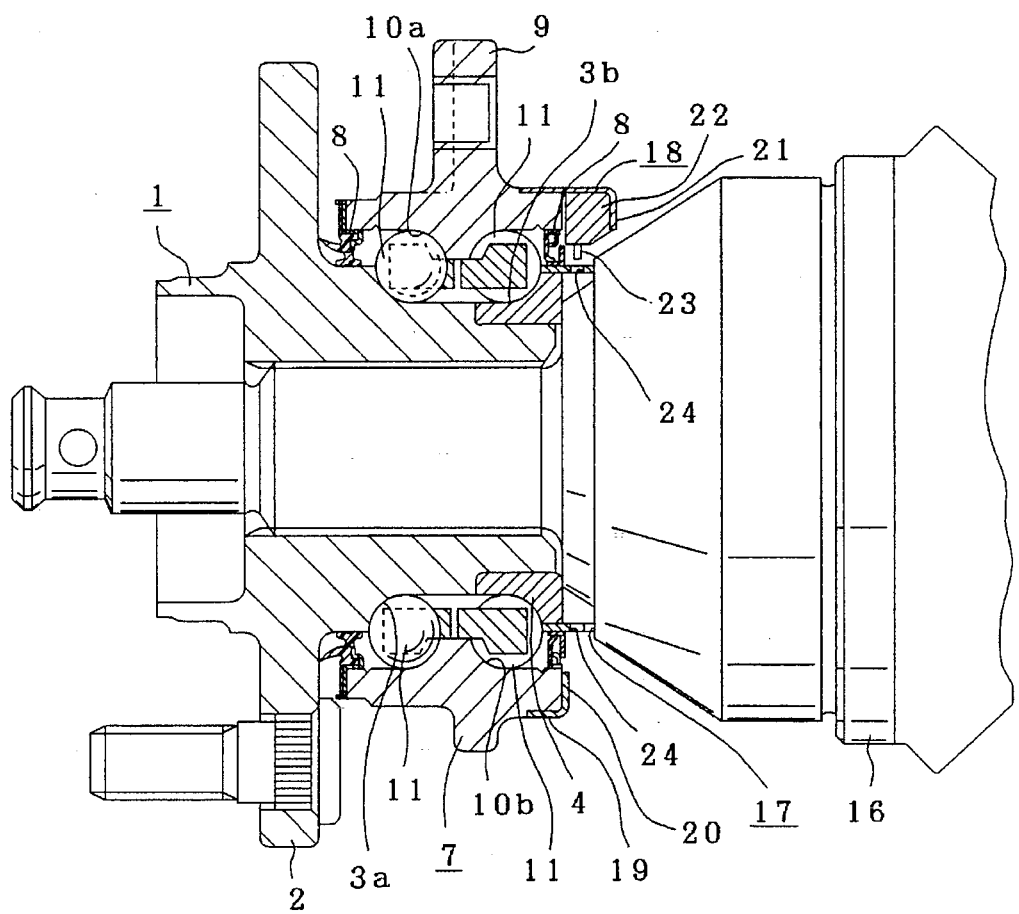
FIG. 2 is a cross sectional view of a second example of the conventional rolling bearing units with the rotating speed sensor.
Figure 3:
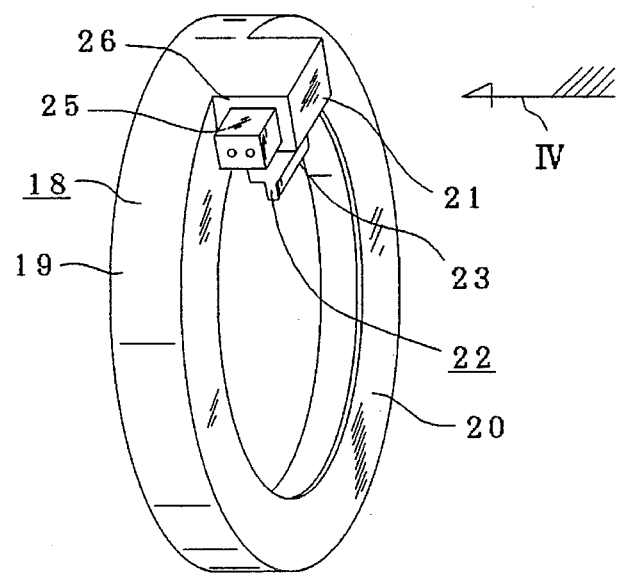
FIG. 3 is a perspective view of a prior art support frame with a sensor installed in it.
Figure 4:
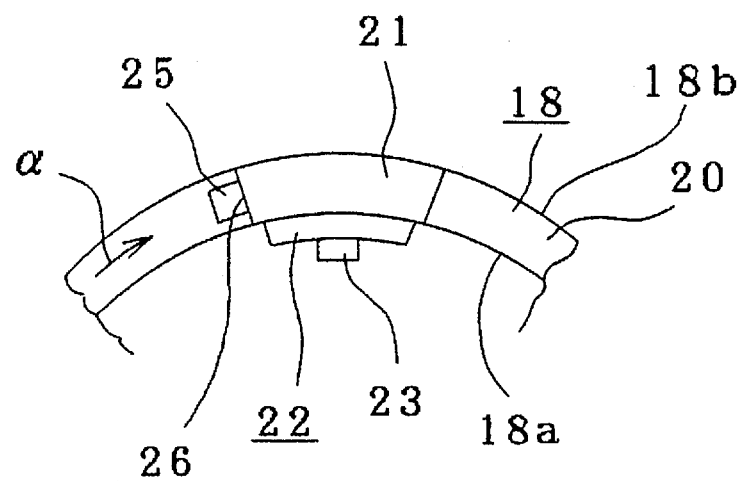
FIG. 4 is a view taken in the direction of arrow IV in FIG. 3.
Figure 5:
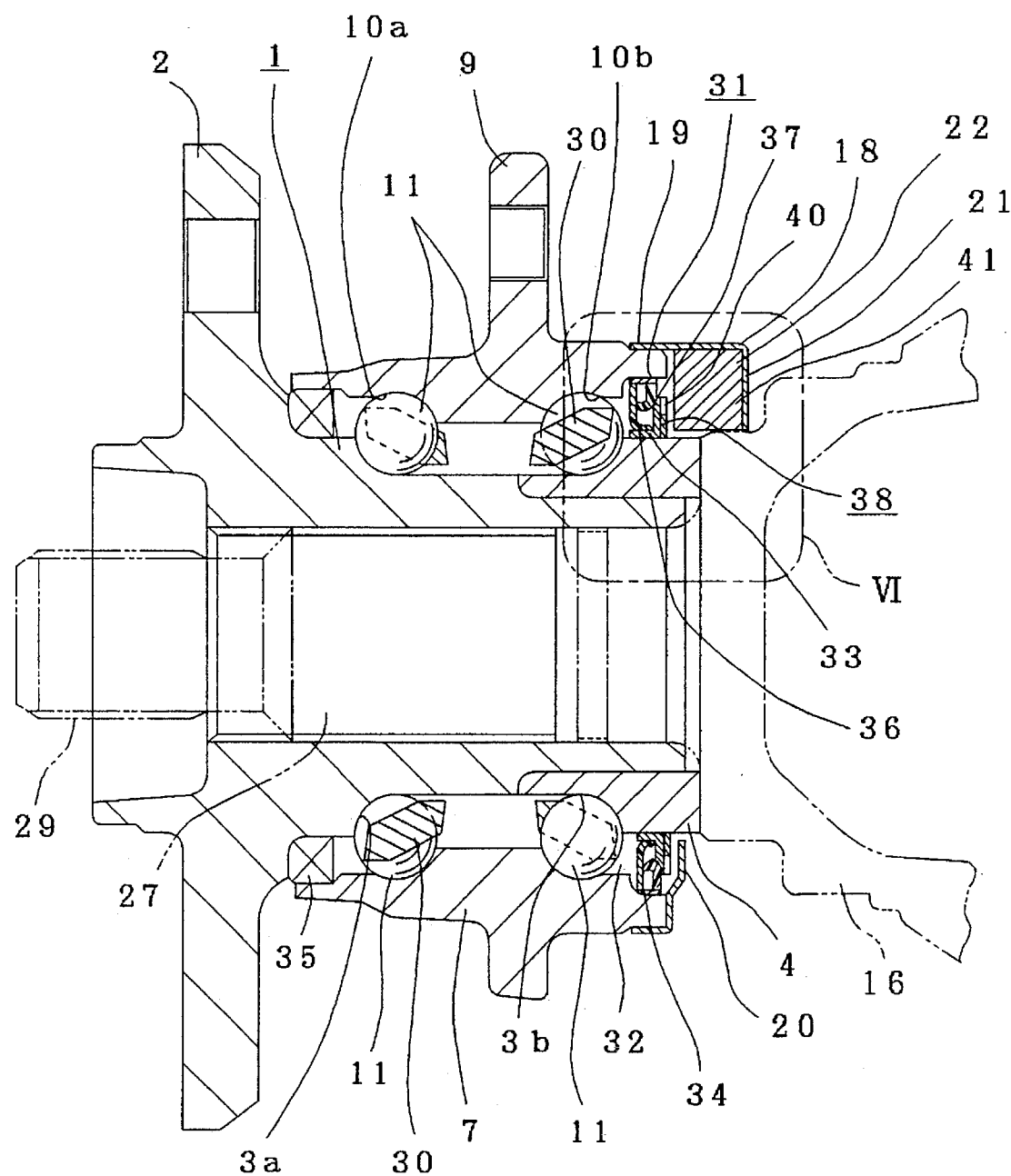
FIG. 5 is a cross sectional view of a first embodiment of the present invention.
Figure 6:
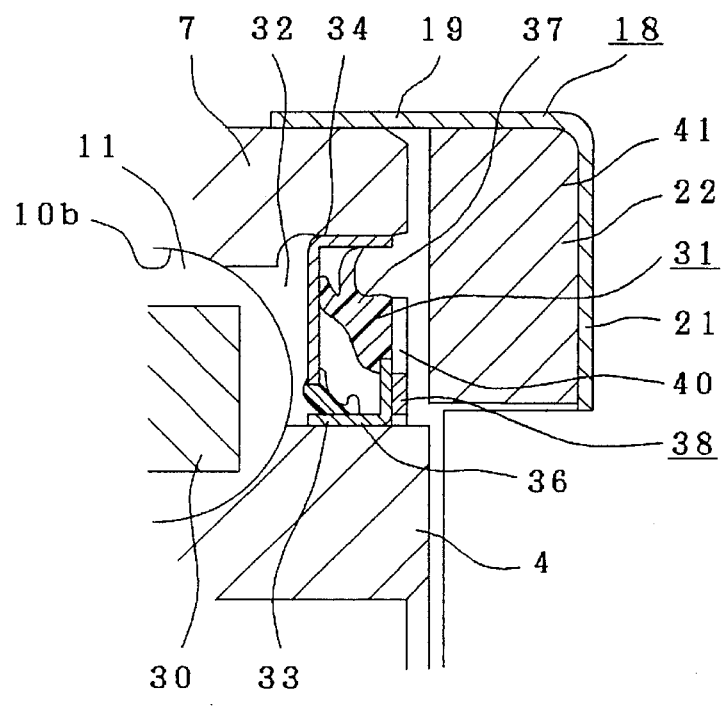
FIG. 6 is an enlarged view of the portion VI in FIG. 5.

FIG. 5 to FIG. 10 show a first embodiment of the rolling bearing unit with the rotating speed sensor in the present invention.

The rolling bearing unit with the rotating speed sensor has a hub 1, at the axially outer end portion (leftmost portion in the FIG. 5) of which a flange 2 is provided for mounting a vehicle wheel (not shown). The hub 1 has a inner ring raceway 3a formed in its outer peripheral surface at its intermediate portion. Fitted onto the outer peripheral surface of the axially inner end portion (right most portion in FIG. 5) of the hub 1 is an inner ring 4 which has an inner ring raceway 3b on its outer peripheral surface.

A driving shaft 27 is inserted into the interior of the hub 1, such that the outer peripheral surface of the driving shaft 27 is engaged with the inner peripheral surface of the hub 1 through spline connection. The driving shaft 27 has a base portion (rightmost portion in FIG. 5) to which a constant velocity joint 16 is connected, and a tip end portion (leftmost portion in FIG. 5) on which a male thread portion 29 is provided. The axially inner end face of the inner ring 4 is abutted to the axially outer end face of the constant velocity joint 16a. Accordingly, the inner ring 4 is fixed at a predetermined position on the outer peripheral surface of the hub 1 by screwing a nut (not shown) onto the male thread portion 29 for clamping.

The outer ring 7 has outer ring raceways 10a, 10b in double rows on its inner peripheral surface and a mount portion 9 on its outer peripheral surface to be supported by a suspension apparatus (not shown). Disposed between the inner ring raceways 3a, 3b and the outer ring raceways 10a, 10b are a plurality of rolling members 11 which are supported by a retrainer 30 in each row, whereby the hub 1 is rotatably supported in the outer ring 7.

The rolling members 11 are depicted in the shape of balls in the embodiments, but tapered rollers may be used in the rolling bearing unit for use in the large-sized vehicle.

A seal assembly 31 is mounted between the outer peripheral surface of the axially inner end portion of the inner ring 4 and the inner peripheral surface of the axially inner end portion of the outer ring 7 so as to close the opening at its axially inner end (right end in FIG. 5) of the space 32 where the rolling members 11 are accommodated. The seal assembly 31 is comprised of an inner seal ring 33 fitted onto the shoulder portion of the inner ring 4, and an outer seal ring 34 fitted into the axially inner end portion of the outer ring 7. Another seal ring 35 is used to cover the opening at the axially outer end (left end in FIG. 5) of the space 32.

The inner seal ring 33 comprises a core metal 36 and a seal member 37. The core metal 36 has an inner side face (right side face FIG. 5 and 6) to which a tone wheel or pulser ring 38 is mounted.

Figure 7:
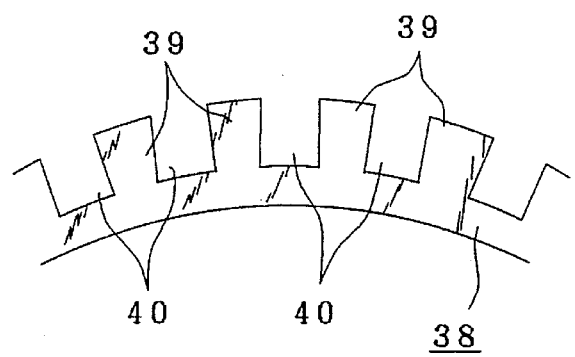
FIG. 7 is a view of part of the tone wheel taken from one side of FIG. 6.

The tone wheel 38 is formed by, e.g., punching a magnetic plate to have a gear shape as shown in FIG. 7, so that the tone wheel 38 has a outer peripheral portion which is formed with tongues 39 and notches 40 alternatively in the circumferential direction and repeatedly arranged with a uniform pitch.

Figure 8:
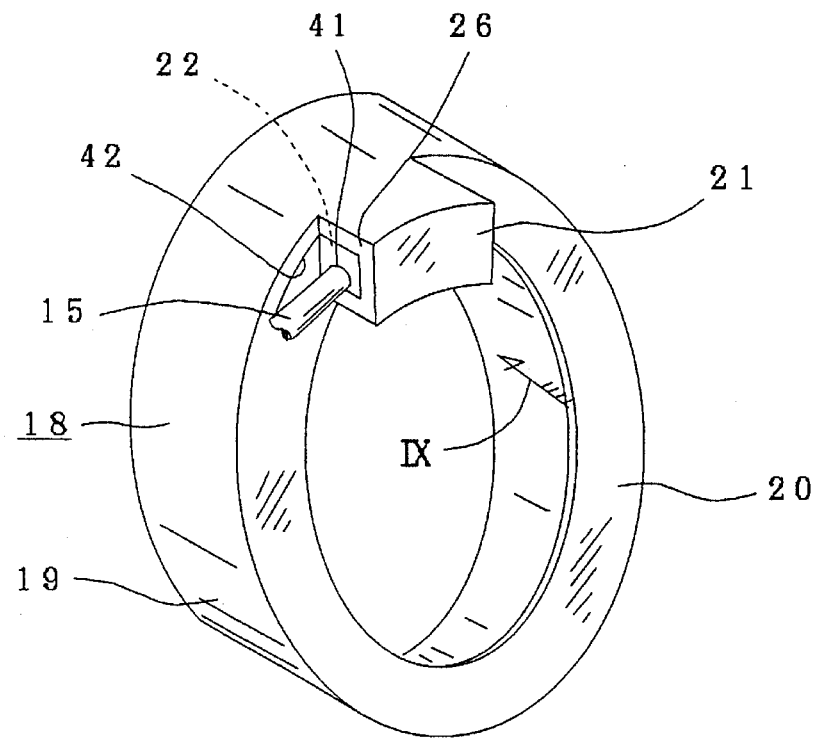
FIG. 8 is a perspective view of the support frame with the sensor and lead incorporated in it in the present invention.
Figure 9:
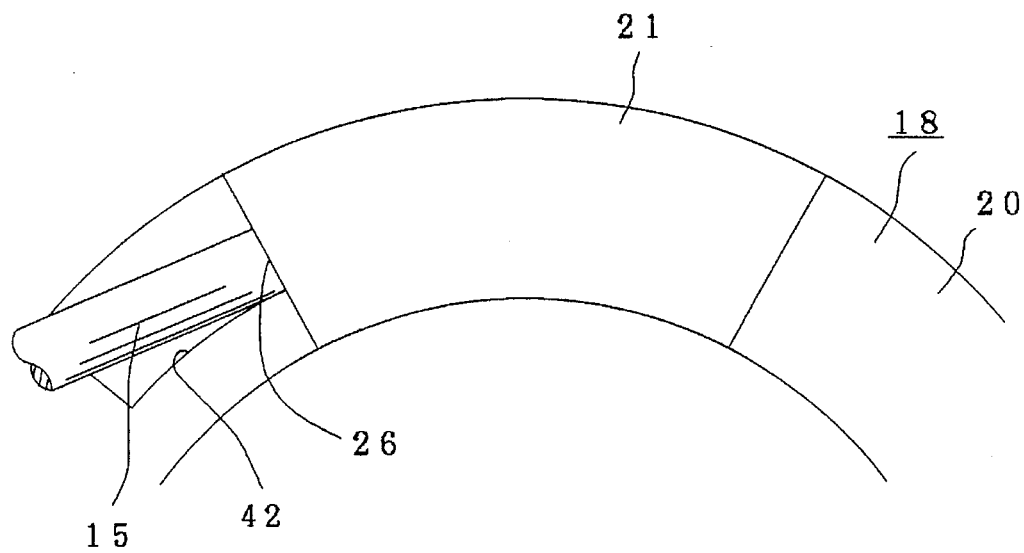
FIG. 9 is a view taken in the direction of IX in FIG. 8.
Figure 10:
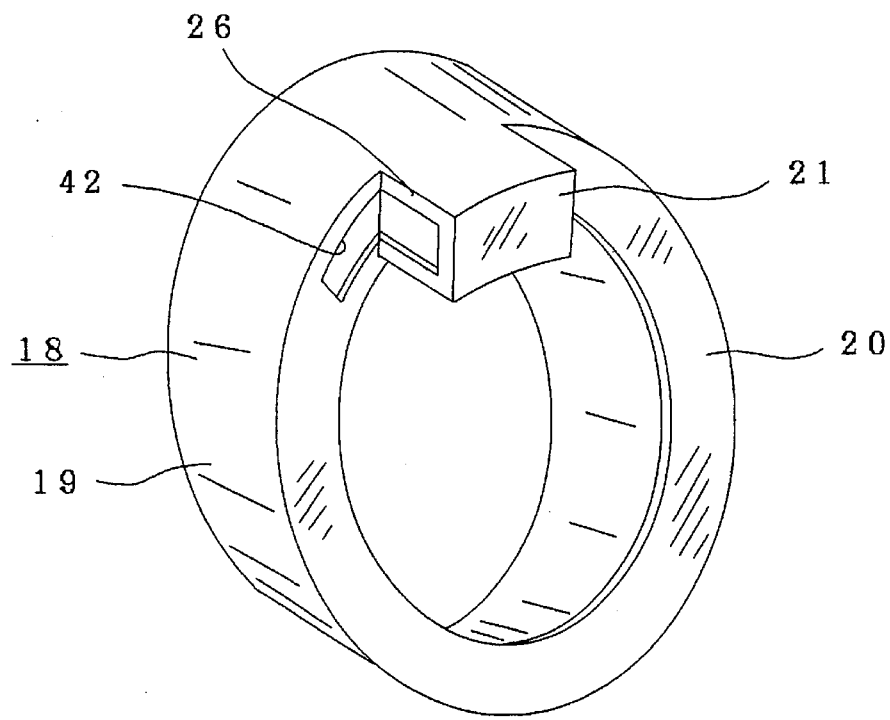
FIG. 10 is a perspective view of the support frame before incorporating the sensor and lead.

A support frame 18 is fitted onto the opening portion at the axially inner end (right side opening portion in FIG. 5) of the outer ring 7 and has a generally annular shape in a L-shaped cross section. The support frame 18 has cylindrical mount portion 19 which can be fitted onto the axially inner end portion of the outer ring 7, a flanged portion which is bent inwards at right angles at axially inner edge of the mount portion 19 and a support portion 21 which is projected from the inner side face (right side face in FIG. 5 and FIG. 6) of the flanged portion 20 to have a radially inwardly facing opening. The support portion 21 is formed in a sector shape which has a larger width on the radially outer side with reference to the support frame 18 and a smaller width on the radially inner side with reference to the support frame 18 as shown in FIGS. 8 and 9. Accordingly, the end wall 26 of the support portion 21 radially extends with reference to the support frame 18.

A sensor 22 is accommodated within the support portion 21 and embedded in a synthetic resin 41 which is a non-magnetic insulating material.

In the rolling bearing unit with the rotating speed sensor, a through-hole 42 is provided from the end wall 26 defining the circumferential end face of the support portion 21 to part of the flanged portion 20 continuously.

The lead 15 of a conductive member to output the signals from the sensor 22 is projected from the end wall 26 through the interior of the through-hole 42.

The through-hole 42 is filled with the synthetic resin which is filled and solidified in the support portion 21 with the sensor 22 in it. In other words, the synthetic resin filled in the support portion 21 partly penetrates the through-hole 42, so that part of the synthetic resin is coupled with the through-hole 42.

With the rolling bearing unit with the rotating speed sensor, the vehicle wheel fixed to the hub 1 is rotatably supported with respect to the suspension apparatus, while the rotating speed of the hub 1 rotating with the vehicle wheel is detected. This operation is substantially the same as in the conventional rolling bearing unit with the rotating speed sensor.

With the rolling bearing unit with the rotating speed sensor in the present invention, the lead 15 of the conductive material is taken out from the end wall 26 of the support portion 21 in the circumferential direction of the support frame 18, so that there is no interference between the lead 15 and the constant velocity joint 16.

In addition, the through-hole 42 for introducing the lead 15 through it reaches the flanged portion 20 from the end wall 26 of the support potion 21, which makes easy the operation to insert the lead 15 into the through hole 42 when the sensor 22 is installed in the support portion 21.

The lead 15 connected in such a way is hardly slipped out of the support portion 21 radially inwards with reference to the support frame 18.

In addition, the synthetic resin filled and solidified in the support portion 21 is partly engaged with the through-hole 42.

The support strength of the sensor 22 with respect to the support frame 18 is sufficiently large in the state where the synthetic resin is filled in the interior of the support portion 21, so that the sensor 22 is embedded in the synthetic resin.

Figure 11:
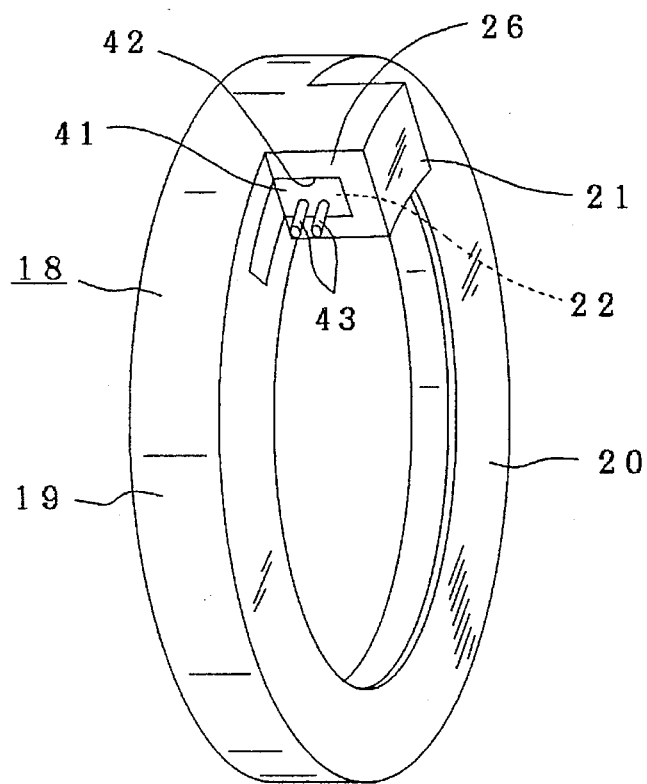
FIG. 11 is a perspective view of the support frame with the sensor and lead incorporated in it in the second embodiment of the present invention.

FIG. 11 illustrates a second embodiment of the present invention. This is different from the first embodiment in that the conductive material is formed in the shape of pins 43 for connector in this embodiment while the conductive material is formed in the shape of the lead 15 in the first embodiment.

The pins 43 are projected out of the end wall 26 of the support portion 21 at the through-hole 42 in the state where the sensor 22 is positioned in the support portion 21 and embedded in the synthetic resin 41, so that the pins 43 are connected to the electric plug at the end of a lead. The other construction and operation are substantially the same as those of the first embodiment.

The rolling bearing unit with the rotating speed sensor in the present invention as constructed above can be easily mounted to the suspension apparatus for use in the driving wheel. In addition, the support rigidity of the sensor to the support frame is sufficiently large, resulting in that the dependability and endurance of the unit is achieved sufficiently.

What is claimed is:

1. A rolling bearing unit with a rotating speed sensor comprising:

a hub having an axially inner end portion and an axially outer end portion to which a flange is provided for mounting a vehicle wheel and an outer peripheral surface on which an inner ring raceway is provided, an outer ring having an axially inner end portion, an outer peripheral surface to which a mount portion is provided for supporting a suspension apparatus and an inner peripheral surface on which an outer ring raceway is formed, a plurality of rolling members provided between the inner ring raceway and the outer ring raceway, a sensor supported by the outer ring and having a detecting portion, a tone wheel mounted to the axially inner end portion of the hub so as to be faced to the detecting portion of the sensor, a support frame made of a metal plate in a generally annular shape, and having a cylindrical mount portion, a flanged portion and a support portion, the cylindrical mount portion having an inner end edge and fitted onto the axially inner end portion of the outer ring, the flanged portion bent inwards at right angles at the inner end edge of the mount portion and having an inner side face, the support portion having a circumferential end face and projected from the inner side face of the flanged portion, so that the sensor is supported within the support portion, and a conductive member projected from the circumferential end face of the support portion to output signals from the sensor, the circumferential end face of the support portion and part of the flanged portion conjointly defining a through-hole, so that the conductive material is extended through the through-hole and projected from the circumferential end face of the support portion, and the support portion being filled with a non-magnetic insulating material, so that the sensor is embedded in the non-magnetic insulating material.

2. The rolling bearing unit with the rotating speed sensor of claim 1, wherein the support portion is of a sector shape having a radially outer width and a radially inner width with reference to the support frame, such that the radially outer width is larger and the radially inner width is smaller.

* * * * *